US008823982B2

(12) United States Patent
Cook

(10) Patent No.: US 8,823,982 B2
(45) Date of Patent: Sep. 2, 2014

(54) SYSTEMS AND METHODS FOR REMOTE DATA STORAGE AND PROCESSING FOR USE WITH PRINTERS

(75) Inventor: Daniel J. Cook, Bar Hill (GB)

(73) Assignee: Global Graphics Software Limited, Cambourne, Cambridge (GB)

( * ) Notice: Subject to any disclaimer, the term of this patent is extended or adjusted under 35 U.S.C. 154(b) by 67 days.

(21) Appl. No.: 13/371,199

(22) Filed: Feb. 10, 2012

(65) Prior Publication Data

US 2012/0287461 A1 Nov. 15, 2012

Related U.S. Application Data

(60) Provisional application No. 61/441,584, filed on Feb. 10, 2011.

(51) Int. Cl.
*G06F 3/12* (2006.01)
*G06K 15/02* (2006.01)
*H04N 1/00* (2006.01)

(52) U.S. Cl.
CPC ........ *G06K 15/1817* (2013.01); *H04N 1/00095* (2013.01); *G06F 3/1285* (2013.01); *G06K 15/1859* (2013.01); *G06F 3/1288* (2013.01); *G06F 3/1287* (2013.01)
USPC .......... 358/1.15; 358/1.16; 709/219; 709/221

(58) Field of Classification Search
CPC ............. G06F 3/1288; H04N 1/00244; H04N 2201/3225; H04N 2201/3242; H04N 2201/3274; H04N 2201/3278
USPC ....................................... 358/1.15, 1.16, 1.18
See application file for complete search history.

(56) References Cited

U.S. PATENT DOCUMENTS

| | | | | |
|---|---|---|---|---|
| 6,067,553 A * | 5/2000 | Downs et al. | ................. | 358/1.18 |
| 6,424,429 B1 * | 7/2002 | Takahashi et al. | ........... | 358/1.16 |
| 2008/0278751 A1 * | 11/2008 | Moyer et al. | ................. | 358/1.15 |
| 2009/0051966 A1 * | 2/2009 | Okigami et al. | ............. | 358/1.15 |
| 2009/0135448 A1 * | 5/2009 | Kawara | ........................ | 358/1.15 |
| 2010/0110486 A1 * | 5/2010 | Takano | ........................ | 358/1.15 |
| 2010/0202015 A1 * | 8/2010 | Misawa | ....................... | 358/1.15 |
| 2011/0134475 A1 * | 6/2011 | Ooba | ............................ | 358/1.15 |

* cited by examiner

*Primary Examiner* — Benny Q Tieu
*Assistant Examiner* — Juan M Guillermety
(74) *Attorney, Agent, or Firm* — Lowe Graham Jones PLLC; Bruce E. Black

(57) ABSTRACT

A method of printing a document includes providing a document to a printer for printing; sending a portion of the document from the printer to an external service provider for temporary storage; and storing the portion of the document on the external service provider. The external service provider comprises a computing device or a server. The method further includes requesting that the portion of the document be sent from the external service provider to the printer for printing; sending the portion of the document from the external service provider to the printer; and printing the portion of the document using the printer.

18 Claims, 3 Drawing Sheets

SYSTEMS AND METHODS FOR REMOTE DATA STORAGE AND PROCESSING FOR USE WITH PRINTERS

CROSS-REFERENCE TO RELATED APPLICATIONS

This application claims the benefit under 35 U.S.C. §119 (e) of U.S. Provisional Patent Application Ser. No. 61/441,584 filed on Feb. 10, 2011, which is incorporated herein by reference.

BACKGROUND

Low-cost printers typically ship with a relatively small amount of RAM and no persistent storage (either hard disk drive (HDD), solid state disk (SSD), memory cards, or the like). That means that although many documents can be printed using streaming page description languages (PDLs) such as PostScript, Printer Control language (PCL), and some forms of the XML Paper specification (XPS), an especially complex document may fail to print because it would require more RAM than is available in the device. Furthermore, documents delivered in non-streaming PDLs (such as PDF and some forms of XPS) must be available to the renderer in their entirety before they can be processed. Thus, they must be stored in the printer. If the printer only has RAM for storage, that reduces the working memory available for processing, which means that even simple documents may fail to print. Any file that's simply too large to be stored locally cannot be processed at all.

BRIEF SUMMARY

One embodiment is a method of printing a document. The method includes providing a document to a printer for printing; sending a portion of the document from the printer to an external service provider for temporary storage; and storing the portion of the document on the external service provider. The external service provider comprises a computing device or a server. The method further includes requesting that the portion of the document be sent from the external service provider to the printer for printing; sending the portion of the document from the external service provider to the printer; and printing the portion of the document using the printer.

Another embodiment is a method of printing a document. The method includes directing a document to be sent to a printer for printing; and, prior to delivering the document to the printer, storing the document on an external service provider to provide temporary storage. The external service provider comprises a computing device or a server. The method further includes notifying the printer of the availability of the document for printing; requesting, by the printer, a portion of the document to be sent to the printer; processing the portion of the document at the printer; repeating the requesting and processing steps until the document is completely processed; and printing the document using the printer.

A further embodiment is a computer readable storage medium having processor-executable instructions. The processor-executable instructions when installed onto a system enable the system to perform actions. The actions include sending a portion of a document from a printer to an external service provider for temporary storage; requesting that the portion of the document be sent from the external service provider to the printer for printing; processing the portion of the document at the printer; and printing the portion of the document using the printer. The external service provider comprises a computing device or a server.

Yet another embodiment is a computer readable storage medium having processor-executable instructions. The processor-executable instructions when installed onto a system enable the system to perform actions. The actions include directing a document to be sent to a printer for printing; prior to delivering the document to the printer, storing the document on an external service provider to provide temporary storage; notifying the printer of the availability of the document for printing; requesting, by the printer, a portion of the document to be sent to the printer; processing the portion of the document at the printer; repeating the requesting and processing steps until the document is completely processed; and printing the document using the printer. The external service provider comprises a computing device or a server.

Another embodiment is a system for printing a document. The system includes a printer and an external service provider associated with the printer and configured and arranged for communication with the printer. The external service provider comprises a computing device or a server. The printer includes a processor configured and arranged to send a portion of a document from the printer to the external service provider for temporary storage, request that the portion of the document be sent from the external service provider to the printer for printing, process the portion of the document at the printer, and print the portion of the document. The external service provider includes a processor configured and arranged to store the portion of the document sent from the printer on the external service provider, and send the portion of the document, upon request, to the printer.

A further embodiment is a system for printing a document. The system includes a printer; and an external service provider associated with the printer and configured and arranged for communication with the printer. The external service provider comprises a computing device or a server. The external service provider includes a processor configured and arranged to, prior to delivering the document to the printer, store the document on the external service provider to provide temporary storage, notify the printer of the availability of the document for printing, and send, upon request by the printer, a portion of the document to the printer. The printer includes a processor configured and arranged to request a portion of the document to be sent to the printer, process the portion of the document at the printer, repeat the request and process steps until the document is completely processed, and print the document using the printer.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of printer, computing device, or server that includes a processor. Suitable printers, computing devices, and servers typically include mass memory and typically include methods for communication with other devices including mobile devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a printer, computing device, or server.

Methods of communication can include both wired and wireless (e.g., RF, optical, or infrared) communications methods and such methods provide another type of computer readable media; namely communication media. Communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Figure 1:
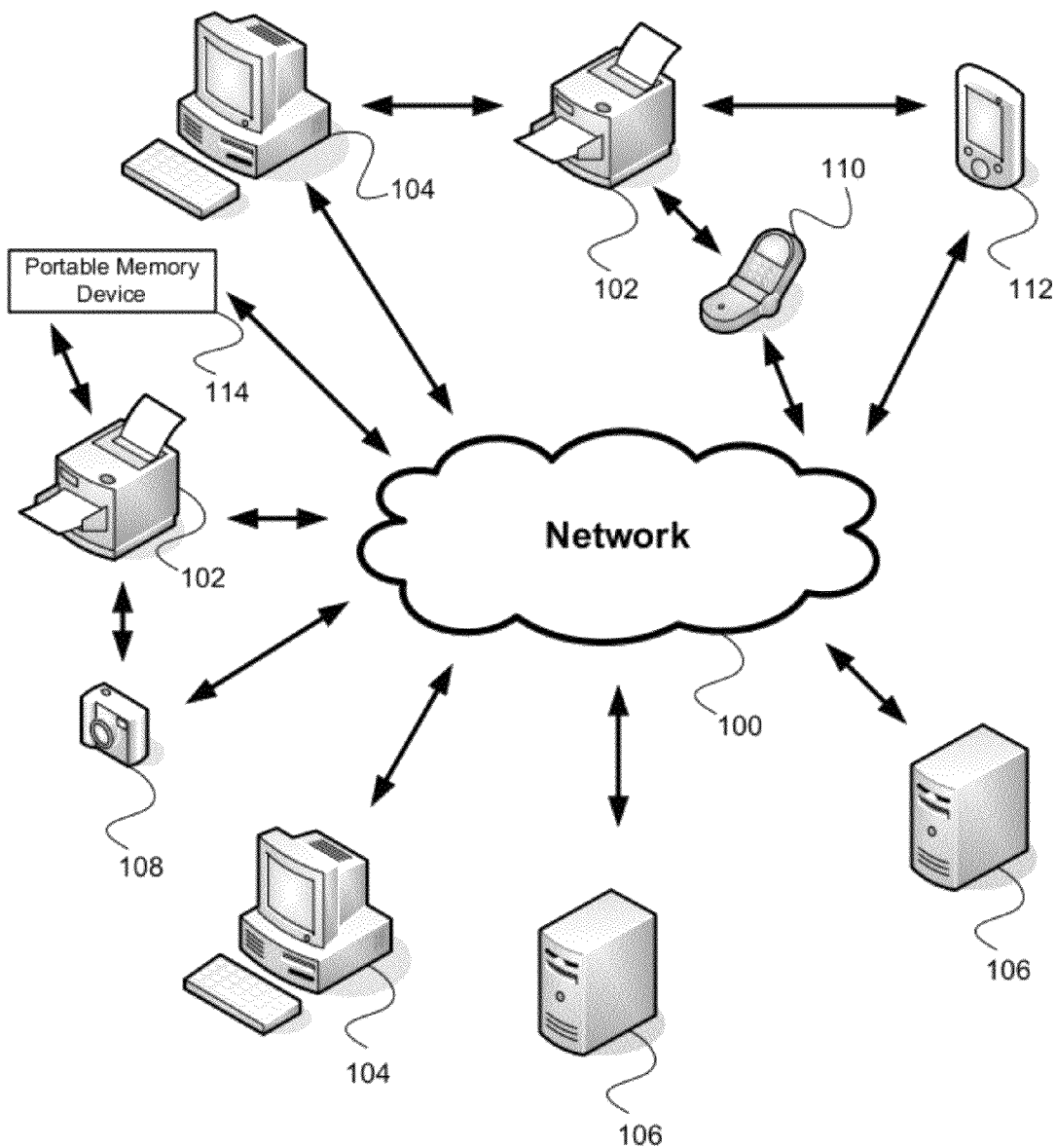
FIG. 1 is a schematic representation of one embodiment of an environment in which the invention can be employed.

FIG. 1 illustrates one embodiment of a network environment. It will be understood that the network environment can be a local area network, a wide area network, or any combination thereof. It will also be understood that the network can include devices, other than those illustrated, coupled to the network and that there may be multiple devices of each type illustrated connected to the network. The environment includes a network 100 to which is attached, either directly or through other devices, one or more printers 102, one or more computing devices 104 (e.g., computers, workstations, and the like), and one or more servers 106. Other devices can optionally be attached to the network such as cameras 108, cellular telephones 110, personal data assistants (PDA's) 112, portable storage devices 114 (e.g., compact discs, DVDs, memory sticks, flash drives, or other optical or magnetic storage media), and the like. Any of these devices can be connected directly to the network or via another device such as a computing device 104, printer 102, or server 106.

To assist the printer with storage and processing of a document for printing, a software client service is installed and runs on one or more of the computing devices 104 or servers 106 connected to the printer 102 through the network 100 (preferably, a local network) or directly, such as through a USB cable. The computing device 104 or servers 106 that have the software client service will be referred to as "service providers." The service listens for requests from printers to store information. In at least some embodiments, the printer is associated with one or more service providers (e.g., computers or servers running the client service). As used herein and unless otherwise indicated, the terms "document", "print job", and "job" are synonymous. Reference to a "portion of the document" can include any part of the document itself, any part of an electronic file containing the document, or any part of the document that has been processed or partially processed. The "portion of the document" can include, but is not limited to, text, graphics and images, embedded fonts, a display list, metadata, raster representations of the document or a part of the document, other data in the electronic file, and the like, or any combinations thereof.

The discovery of service providers and association may be performed in any of a variety of ways. For example, a printer connected directly to a single computer or server, e.g. over a USB cable, can default to using the connected computer or server as a service provider. Alternatively or additionally, a printer driver designed to drive a printer may include the client service, so that the printer can identify the source of a print job as a service provider and can request services from it on the back-channel to that computer. Alternatively or additionally, the printer may require or accept manual configuration with the location of a service provider (e.g. by keying in an IP address and a port number). Alternatively or additionally, service providers may issue occasional broadcast messages which identify them as such. The messages are received by printers on the same local area network and enable them to build a list of available service providers. Alternatively or additionally, printers may issue occasional broadcast messages that identify themselves as such. The messages are received by service providers and replied to in order to establish an association. Alternatively or additionally, a service may be used to discover and associate printers with service providers.

A single service provider may be associated with one or more printers. A single printer may be associated with one or more service providers.

The printer may utilize the service at any time; however, the service will typically be most useful when the printer is not able to store or process the document that is to be printed. For example, the printer may determine to utilize the service if it determines that it does not have sufficient resources to process the document sent to it. As an example, the printer may determine to utilize the service if the printer finds itself in a situation where it does not have sufficient RAM to process a job. The lack of sufficient RAM may even occur after the printer performs its normal low memory actions (such as purging caches of data that can be reconstructed).

Figure 2:
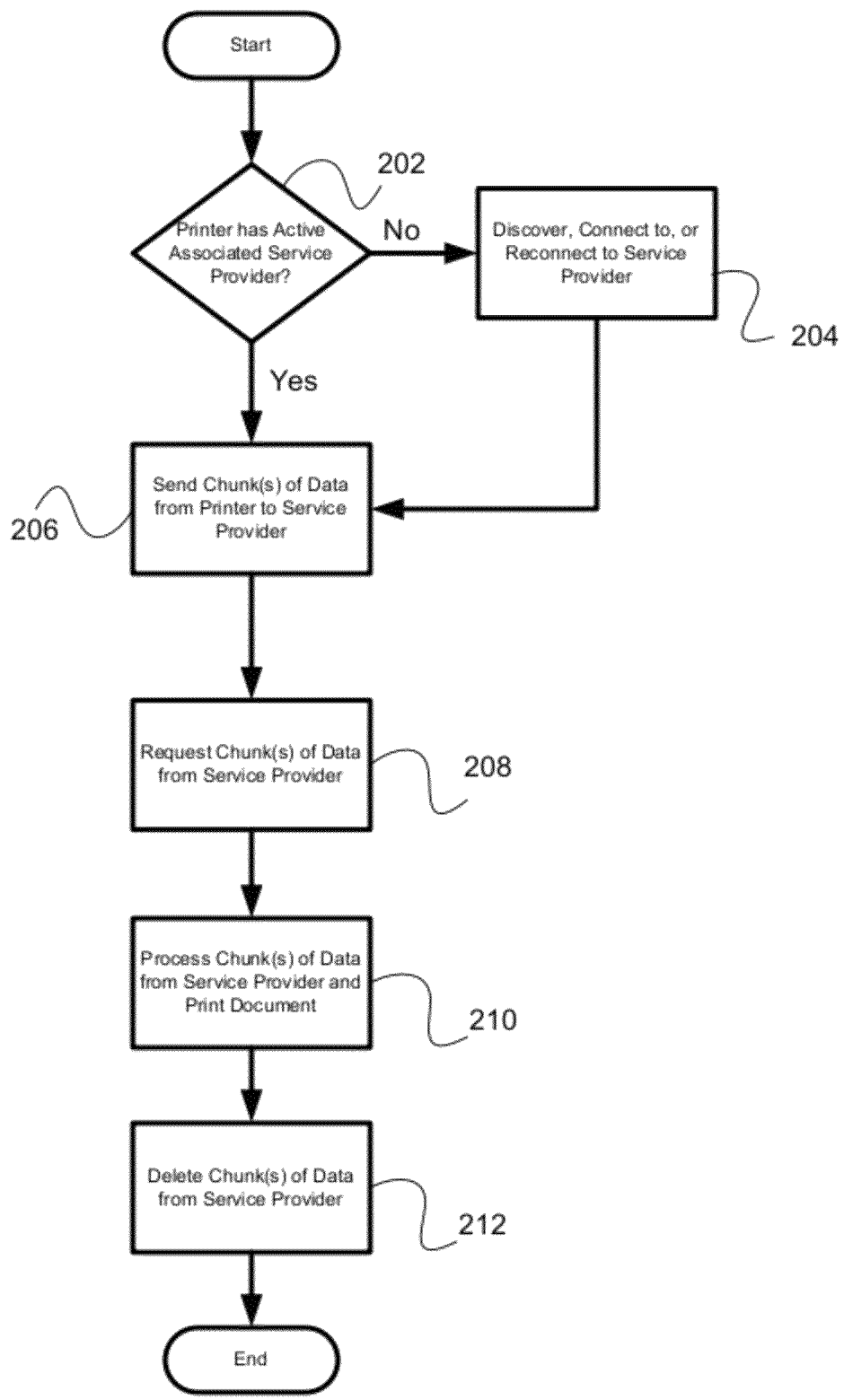
FIG. 2 is a schematic flow chart of one embodiment of printing a document using a printer and an external service provider, according to the invention.

FIG. 2 is a block diagram illustrating one method of utilizing the service. In step 202, the printer determines whether it has an active associated service provider and, if not, the printer discovers, connects or re-connects to a service provider (step 204). In step 206, the printer sends to the service provider a chunk of data (e.g., a portion of a document) for storage with an associated unique identifier. A chunk of data is any collection of bytes that may represent text, a font, an image, a page, or any other data read from the incoming document or generated by the printer. It may also represent any combination of such collections of bytes, or a subset of a collection (e.g. data representing a subset of an image, such as a tile, or one color channel of an image). The service provider stores the data in whatever form is convenient for it. In at least some embodiments, storage will be in local RAM for performance reasons (RAM is much faster than hard disk), but data can be stored on a disk or other storage medium. It will be recognized that the printer may also send other data created by or installed on the printer system in response to the current or previous jobs.

As the printer processes the job it requests chunks of data back from the service provider as needed (step 208). The request includes the unique identifier associated with each chunk. The printer processes the chunks of data and prints the document (step 210). At the end of the print job, or when the printer knows it no longer requires a stored chunk of data, it instructs the service provider to delete one or more specified data chunks (step 212). Alternatively, the printer may request that all stored data chunks be deleted. Although FIG. 2 illustrates steps 206, 208, 210, and 212 in linear form, it will be recognized that these steps can be performed multiple times with different chunks of data and that processing the data, printing the data, and deleting the data from the service provider may be performed in a variety of different temporal arrangements for the multiple chunks of data.

In some embodiments, the printer may choose to store chunks of data on the service provider even if those chunks could be reconstructed from other data that the printer holds, particularly if it would be slower to perform that reconstruction than it would be to send and retrieve the data from the service provider. In some embodiments, the printer may request a subset of a data chunk by including one or more byte ranges with the request. The service provider will respond by delivering data between the start and end offsets within the data chunk as defined by each byte range. Byte range specifications may be relative to the start of the data chunk or to its end or any other suitable designation.

In some embodiments, the service provider may enable the printer to request it to perform searches within a data chunk and to deliver data on the basis of the results of such a search. An example of such use would be for the printer to ask the service provider to search for the last occurrence of a token 'xref' within a file and to deliver all data between that and the end of the file to the printer. This would enable the printer to obtain the main cross-reference table from a PDF file and sufficient information to determine whether that table is complete, whether the file is linearized, or how to start requesting additional data to complete the cross-reference table and to interpret the body of the file.

Figure 3:
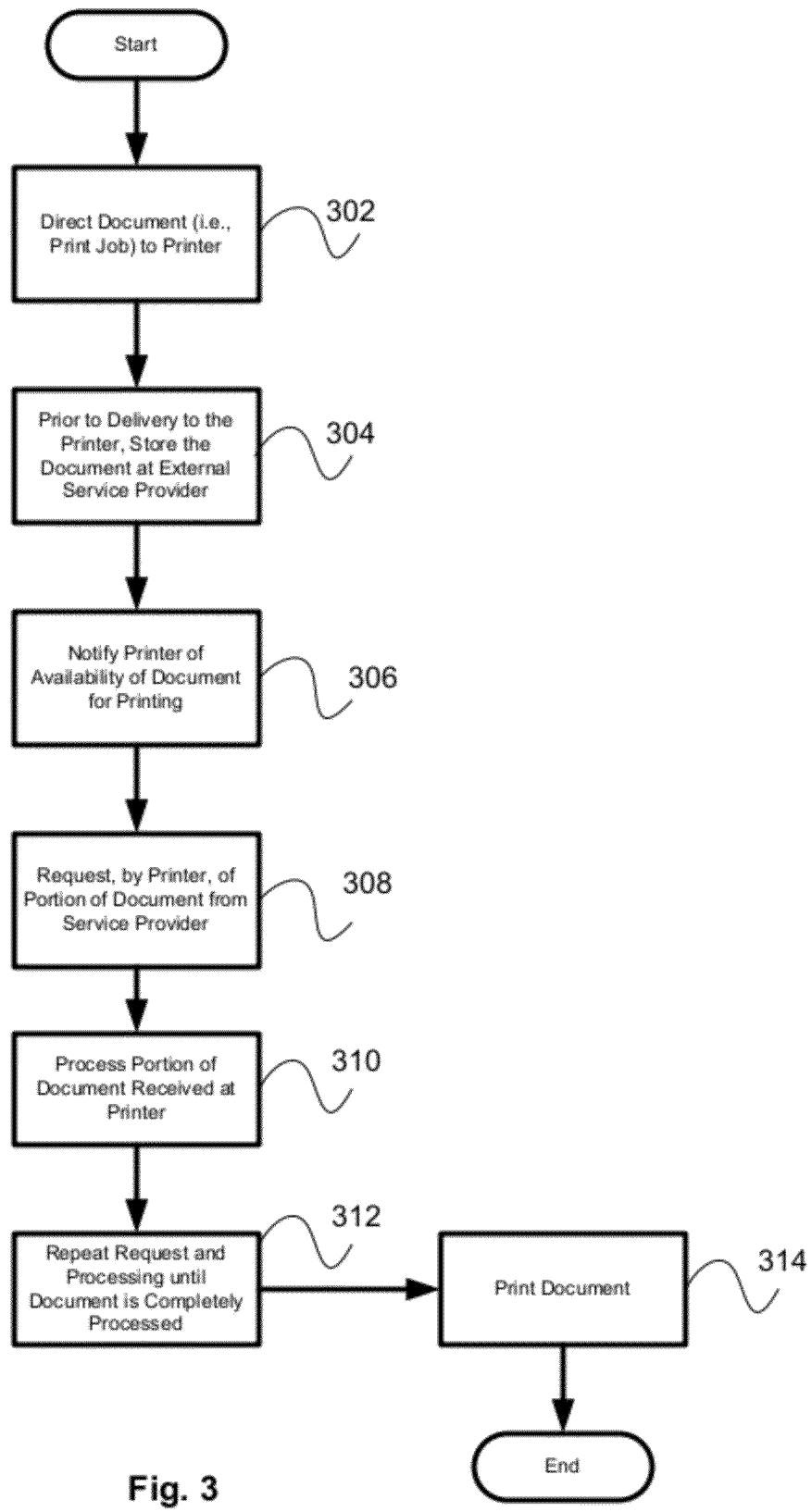
FIG. 3 is a schematic flow chart of another embodiment of printing a document using a printer and an external service provider, according to the invention.

In some embodiments, particularly where the service provider is associated with a channel through which the print job is supplied, the service provider may proactively store data. FIG. 3 is a flow chart illustrating one embodiment of a process. In step 302, a document (i.e., print job) is directed to a printer. Before the document is provided to the printer, an external service provider stores the document (step 304). In such cases the service provider will notify the printer of the availability of the job (step 306) and optionally include one or more of characteristics of the print job in the notification. The characteristics provided may include, but are not limited to, the file/job size (if known); the file/job name (if known); the format in which the service provider has received or plans to deliver the print job (e.g. XPS, PDF, Word document etc; if the service provider includes the capability of identifying the file type); the first few bytes of the file/job (if the service provider does not include the capability of identifying the file type). The first few bytes of the file/job, in combination with a file name, will often be sufficient to enable the printer to identify the file type, or at least to determine what additional data to request in order to be able to do so.

The service provider can store the entire job file as a single data chunk or in multiple data chunks. Having received notification of the availability of a print job in this way the printer can then request data from the service provider as necessary to process the file (step 308). Depending on the file size, file type, printer capabilities, etc, the printer may request the whole data chunk in one piece, or may request a series of subsets of the data chunk as required to process that job within the storage capabilities of the printer. The printer processes the portion of the job that is received (step 310) and the request and processing is repeated until the processing of the print job is completed (step 312) and the document (or at least a part of the document) is printed (step 314).

In some embodiments that proactively store print job data the service provider may have the capability of recognizing the format of the stored data and include specific code for at least some formats. Using the example of searching within a data chunk given above, the service provider may automatically search for the last xref in the whole-job data chunk and send data between that and the end of file as part of the job characteristics delivered to the printer with a job notification.

In at least some embodiments the client service may be running on a non-local server or computing device, e.g. in the cloud, either on-premise, or outside the site on which the printer is situated. In some embodiments the service provider may be extended to include additional capabilities to process data chunks as well as simply storing and returning them. As an example, the printer may provide a data chunk that represents image data. When the service provider has additional capabilities the printer may inform it that the data chunk is image data, and provide additional information such as the color space, bit depth, pixel dimensions, interleaving, orientation, compression used to encode the image data, or the like. The printer may then request that the service provider perform actions such as rotation, down- or sub-sampling, color space conversion, or the like on the data.

An extended service provider may also be useful in a situation even where the printer has persistent storage (HDD, SSD etc) or sufficient RAM to fully process the job on the printer itself. In particular, the service provider will typically have a more powerful central processing unit and more RAM (requiring less use of interim compression, etc). Thus, use of the service provider may accelerate job printing, even when the time taken to transfer data between the printer and service provider and the latency of commands and responses is taken into account.

An extended service provider could be supplied by a vendor as a client application to run on any computer, as described above. Alternatively if could be supplied as a 'black box' designed for direct connection to a printer, or to a network that includes one or more printers.

A printer may discover the availability of extended service providers through a number of routes including any of those described above for discovering a service provider. For example, there may be an assumption in the printer code that any service provider identified will have specific extended capabilities. Alternatively or additionally, discovery may be by manual configuration of the printer as part of the association with a service provider. Alternatively or additionally, discovery may be by inclusion of information regarding service provider capabilities in any of the automated discovery mechanisms described above.

Using the methods and systems describe above, a low-cost printer can be able to print jobs that it would not otherwise be capable of doing. The impact on printer speed for jobs that do not require recourse to the service provider will typically be negligible (if there is any at all). Print jobs that do make use of the service provider may be relatively slow in at least some instances, but such print jobs might not be otherwise printable. Typically, the services provided by the service provider can be achieved with only insignificant load on any additional computers on the network or attached to the printer in any other way (unless an extended service provider is used, e.g. for remote image processing). Use of an extended service provider may provide benefits such as an even greater proportion of supplied jobs can be printed and the printing of large and complex jobs may be faster because the service provider will typically have a more powerful CPU and more RAM (requiring less use of interim compression, etc).

It will be understood that each block of the flowchart illustrations in FIGS. 2 and 3, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor, provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The computer program instructions, or portions of the computer program instructions, can be stored on any suitable computer-readable medium including, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A method of printing a document, the method comprising: providing a document to a printer for printing; sending a portion of the document from the printer to an external service provider for temporary storage; storing the portion of the document on the external service provider, wherein the external service provider comprises a computing device or a server; requesting that the portion of the document be sent from the external service provider to the printer for printing, wherein requesting that the portion of the document be sent from the external service provider comprises requesting that part of the portion of the document be sent from the external service provider to the printer, wherein the printer specifies the part to be sent; sending the portion of the document from the external service provider to the printer; and printing at least part of the portion of the document using the printer.

2. The method of claim 1, further comprising associating the printer with the external service provider.

3. The method of claim 1, wherein the portion of the document sent to the external service provider comprises data associated with text, a font, an image, or a page of the document.

4. The method of claim 1, further comprising providing an identifier associated with the portion of the document sent by the printer to the external service provider.

5. The method of claim 1, further comprising requesting, by the printer, a search be performed on the portion of the document by the external service provider to identify a search object.

6. The method of claim 1, further comprising requesting, by the printer, deletion of the portion of the document stored on the external service provider.

7. The method of claim 1, wherein storing the portion of the document comprises storing the portion of the document in RAM of the external service provider.

8. The method of claim 1, further comprising partially processing, for printing, the portion of the document at the external service provider.

9. A method of printing a document, the method comprising: directing a document to be sent to a printer for printing; prior to delivering the document to the printer, storing the document on an external service provider to provide temporary storage, wherein the external service provider comprises a computing device or a server; notifying the printer of the availability of the document for printing; requesting, by the printer to the external service provider, a portion of the document to be sent to the printer, wherein requesting the portion of the document to be sent to the printer comprises requesting, by the printer to the external service provider, part of the portion of the document be sent from the external service provider to the printer, wherein the printer specifies the part to be sent; processing the portion of the document at the printer; repeating the requesting and processing steps at least once until the document is completely processed; and printing at least part of the document using the printer.

10. The method of claim 9, further comprising partially processing, for printing, at least part of the document at the external service provider.

11. The method of claim 9, wherein notifying the printer comprises sending one or more characteristics of the document to the printer.

12. A non-transitory computer readable storage medium having processor-executable instructions, the processor-executable instructions when installed onto a system enable the system to perform actions, comprising: directing a document to be sent to a printer for printing; prior to delivering the document to the printer, storing the document on an external service provider to provide temporary storage, wherein the external service provider comprises a computing device or a server; notifying the printer of the availability of the document for printing; requesting, by the printer to the external service provider, a portion of the document to be sent to the printer, wherein requesting the portion of the document to be sent to the printer comprises requesting, by the printer to the external service provider, part of the portion of the document be sent from the external service provider to the printer, wherein the printer specifies the part to be sent; processing the portion of the document at the printer; repeating the requesting and processing steps at least once until the document is completely processed; printing at least part of the document using the printer.

13. A system for printing a document, the system comprising: a printer; and an external service provider associated with the printer and configured and arranged for communication with the printer, wherein the external service provider comprises a computing device or a server; wherein the printer comprises a processor configured and arranged to send a portion of a document from the printer to the external service provider for temporary storage, request that the portion of the document be sent from the external service provider to the printer for printing, wherein the request that the portion of the document be sent from the external service provider comprises a request that part of the portion of the document be sent from the external service provider to the printer, wherein the printer specifies the part to be sent, process the portion of the document at the printer, and print at least part of the portion of the document; and wherein the external service provider comprises a processor configured and arranged to store the portion of the document sent from the printer on the external service provider, and send the portion of the document, upon request, to the printer.

14. The system of claim 13, wherein the processor of the external service provider is further configured and arranged for at least partially processing a part of the document for printing.

15. The system of claim 13, wherein processor of the external service provider is further configured and arranged to search the portion of the document upon request by the printer.

16. The system of claim 13, wherein the processor of the printer is configured and arranged to direct the external service provider to delete the portion of the document.

17. A system for printing a document, the system comprising: a printer; and an external service provider associated with the printer and configured and arranged for communication with the printer, wherein the external service provider comprises a computing device or a server; wherein the external service provider comprises a processor configured and arranged to prior to delivering the document to the printer, store the document on the external service provider to provide temporary storage, notify the printer of the availability of the document for printing, and send, upon request by the printer, a portion of the document to the printer; and wherein the printer comprises a processor configured and arranged to request a portion of the document to be sent to the printer, wherein the request that the portion of the document be sent to the printer comprises a request that part of the portion of the document be sent from the external service provider to the printer, wherein the printer specifies the part to be sent, process the portion of the document at the printer, repeat the request and process steps at least once until the document is completely processed, and printing print at least part of the document using the printer.

18. The system of claim 17, wherein the processor of the external service provider is further configured and arranged for at least partially processing a part of the document for printing.

* * * * *